US009168846B2

(12) United States Patent  
Sasaki et al.

(10) Patent No.: US 9,168,846 B2  
(45) Date of Patent: Oct. 27, 2015

(54) VEHICLE SEAT

(75) Inventors: Tetsuya Sasaki, Yokohama (JP); Hideo Mori, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 327 days.

(21) Appl. No.: 13/538,977

(22) Filed: Jun. 29, 2012

(65) Prior Publication Data

US 2013/0001999 A1    Jan. 3, 2013

(30) Foreign Application Priority Data

Jul. 1, 2011   (JP) ................................ 2011-147305

(51) Int. Cl.
| | |
|---|---|
| B60N 2/02 | (2006.01) |
| B60N 2/015 | (2006.01) |
| B60N 2/30 | (2006.01) |
| B60N 2/20 | (2006.01) |
| B60N 2/22 | (2006.01) |
| B60N 2/32 | (2006.01) |

(52) U.S. Cl.  
CPC ............ B60N 2/01516 (2013.01); B60N 2/206 (2013.01); B60N 2/22 (2013.01); B60N 2/305 (2013.01); B60N 2/309 (2013.01); B60N 2/3011 (2013.01); B60N 2/3029 (2013.01); B60N 2/3063 (2013.01); B60N 2/3065 (2013.01); B60N 2/3088 (2013.01); B60N 2/32 (2013.01)

(58) Field of Classification Search  
None  
See application file for complete search history.

(56) References Cited

U.S. PATENT DOCUMENTS

| | | | | |
|---|---|---|---|---|
| 2,859,798 | A * | 11/1958 | Carte | 297/321 |
| 5,527,087 | A * | 6/1996 | Takeda et al. | 297/15 |
| 5,588,707 | A * | 12/1996 | Bolsworth et al. | 297/378.12 |
| 6,152,533 | A * | 11/2000 | Smuk | 297/341 |
| 6,199,951 | B1 * | 3/2001 | Zeile et al. | 297/341 |
| 7,121,624 | B2 * | 10/2006 | Pejathaya et al. | 297/378.12 |
| 7,137,666 | B2 * | 11/2006 | Haladuda et al. | 297/378.12 |
| 7,328,929 | B2 * | 2/2008 | Epaud | 296/65.09 |
| 7,374,244 | B2 * | 5/2008 | Becker et al. | 297/341 |

(Continued)

FOREIGN PATENT DOCUMENTS

| | | | |
|---|---|---|---|
| EP | 2045120 | | 4/2009 |
| GB | 2380933 | A * | 4/2003 |

(Continued)

OTHER PUBLICATIONS

Office Action mailed Apr. 2, 2013 in Corresponding Japanese Patent Application No. 2011-147305.

(Continued)

*Primary Examiner* — David E Allred  
(74) *Attorney, Agent, or Firm* — Knobbe Martens Olson & Bear LLP

(57) ABSTRACT

A vehicle seat is equipped with a base frame, a seatback and a seat cushion. A lower end side of a seatback frame is joined to the base frame via a recliner shaft. A cushion joining portion is provided at a front end side of the lower end side of the seatback frame relative to the recliner shaft. The cushion joining portion turns to a seat lower side and seat rearward side about the recliner shaft when the seatback is tilted forward. A rear end side of a seat cushion frame is joined to the cushion joining portion to be turnable about a joining shaft. A front portion side of the seat cushion frame is supported at the base frame to be movable to follow the turning of the cushion joining portion when the seatback is tilted forward.

5 Claims, 5 Drawing Sheets

(56) References Cited

U.S. PATENT DOCUMENTS

| | | |
|---|---|---|
| 7,588,282 B2 * | 9/2009 | Kolena et al. ............... 296/65.09 |
| 2003/0047977 A1 | 3/2003 | Lejeune et al. |
| 2007/0018492 A1 * | 1/2007 | Becker et al. ............ 297/378.12 |
| 2009/0108616 A1 * | 4/2009 | Kolena et al. ............... 296/65.05 |

FOREIGN PATENT DOCUMENTS

| | | |
|---|---|---|
| JP | 4-29437 U | 3/1992 |
| JP | 07-223474 A | 8/1995 |
| JP | 11-334421 | 12/1999 |
| JP | 2003-220865 A | 8/2003 |
| JP | 2010-280374 A | 12/2010 |
| WO | WO 2009/094756 A1 | 8/2009 |

OTHER PUBLICATIONS

Search Report dated Nov. 2, 2012 in corresponding European Application No. 12173745.6.

* cited by examiner

VEHICLE SEAT

CROSS-REFERENCE TO RELATED APPLICATION

This application claims priority under 35 USC 119 from Japanese Patent Application No. 2011-147305 filed Jul. 1, 2011, the disclosure of which is incorporated by reference herein.

BACKGROUND

1. Technical Field

The present invention relates to a vehicle seat at which a seatback may be tilted forward.

2. Related Art

In an automobile seat device disclosed in Japanese Patent Application Laid-Open (JP-A) No. 11-334421, a seating portion (seat cushion) of a rear seat is joined to a floor panel via a parallel link mechanism. This parallel link mechanism supports the seat cushion at a floor panel to enable swinging of the seat cushion between a forward position and a rearward position. A seat rear resting portion (seatback) is joined to a rear end portion of the seat cushion via a recliner mechanism, and the seatback may tilt onto the seat cushion (tilt forward). Thus, space in a luggage compartment may be increased.

However, an automobile seat device with the structure described above has a constitution in which the seat cushion does not displace to the lower side relative to the forward position or rearward position thereof. Consequently, in the state in which the seatback is tilted onto the seat cushion, a height at which the seatback is disposed may not be low enough. Therefore, there is room for improvement in the matter of increasing space above the seatback.

SUMMARY

In consideration of the situation described above, the present invention provides a vehicle seat that may increase space above a tilted-forward seatback.

A vehicle seat according to a first aspect of the present invention includes: a base frame mounted to a vehicle body floor portion; a seatback, a lower end side of a seatback frame thereof being joined to the base frame via a recliner shaft along a seat width direction, the seatback being capable of tilting forward about the recliner shaft, a cushion joining portion being provided at a front end side of the lower end side of the seatback frame relative to the recliner shaft, and the cushion joining portion turning to a seat lower side and seat rearward side about the recliner shaft when the seatback is tilted forward; and a seat cushion, a rear end side of a seat cushion frame thereof being joined to the cushion joining portion to be turnable about a joining shaft along the seat width direction, and a front portion side of the seat cushion frame being supported at the base frame to be movable to follow the turning of the cushion joining portion when the seatback is tilted forward.

In the vehicle seat of the first aspect of the invention, when the seatback tilts forward about the recliner shaft with respect to the base frame, the cushion joining portion that is provided at the front end side relative to the recliner shaft, at the lower end side of the seatback frame, turns to the seat lower side and seat rearward side about the recliner shaft. The rear end side of the seat cushion frame is turnably joined to the cushion joining portion via the joining shaft along the seat width direction, and the front portion side of the seat cushion frame is supported at the base frame to be capable of moving to follow the turning of the cushion joining portion. Therefore, when the cushion joining portion turns as described above, the rear end side of the seat cushion frame moves to the seat lower side and seat rearward side, and the front portion side of the seat cushion frame moves to follow the turning of the cushion joining portion, that is, moves to the seat lower side and seat rearward side. Thus, the seat cushion is moved to the seat lower side and the seat rearward side in conjunction with the forward tilting of the seatback, and a height at which the seatback overlaid on the seat cushion by the forward tilting is disposed may be lowered. Therefore, space above the forward-tilted seatback may be increased.

In a vehicle seat according to a second aspect of the present invention, in the first aspect of the present invention, in a state in which the seatback is disposed in an upright position before being tilted forward, a central axis of the joining shaft is disposed at the same height as a central axis of the recliner shaft or at the seat lower side relative to the central axis of the recliner shaft.

In the vehicle seat of the second aspect of the invention, in the state in which the seatback is disposed in the upright position, the central axis of the joining shaft that joins the cushion joining portion of the seatback frame to the rear end side of the seat cushion frame is disposed at the same height as the central axis of the recliner shaft or at the seat lower side relative to the central axis of the recliner shaft. Hence, when the seatback is tilted forward from the upright position, the joining shaft, that is, the rear end side of the seat cushion frame, may be turned (moved) to the seat lower side and seat rearward side immediately. That is, in a structure in which the central axis of a joining shaft is disposed at the seat upward side relative to the central axis of a recliner shaft in the state in which a seatback is disposed in the upright position, the rear end side of the seat cushion frame is temporarily turned to the seat lower side and seat forward side by forward tilting, before turning to the seat lower side and seat rearward side. However, this may be avoided with the present invention. Therefore, a movement amount of the seat cushion to the seat rearward side may be specified to be larger, and a larger space may be assured at the forward side of the seat cushion in the state in which the seatback is tilted forward.

In a vehicle seat according to a third aspect of the present invention, in the first aspect of the present invention, the front portion side of the seat cushion frame is supported at the base frame via a link member that is joined to each of the front portion side and the base frame to be turnable about respective axes along the seat width direction.

In the vehicle seat of the third aspect of the invention, because the front portion side of the seat cushion frame is supported at the base frame via the link member, the front portion side is movable to follow the turning of the the cushion joining portion when the seatback is tilted forward. Therefore, a support structure of the front portion side of the seat cushion frame at the base frame may have a simple structure.

In a vehicle seat according to a fourth aspect of the present invention, in the first aspect of the present invention, the seatback frame includes: a frame main body; and a bracket that is fixed to a lower end side of the frame main body, that is joined to the base frame via the recliner shaft, and at which the cushion joining portion is provided.

In the vehicle seat of the fourth aspect of the invention, the bracket, which is a structural member of the seatback frame, is fixed to the lower end side of the frame main body of the seatback frame, and is joined to the base frame via the recliner shaft. The cushion joining portion to which the rear end side of the seat cushion frame is joined is provided at the bracket.

Thus, the frame main body of the seatback frame and the seat cushion frame are joined to the base frame via the bracket. Therefore, when the vehicle seat is being fabricated, the bracket may be assembled to the base frame before the the frame main body of the seatback and the seat cushion frame, which have large weights, are fixed or joined to the bracket. Therefore, operations in fabrication of the vehicle seat may be made easier.

In a vehicle seat according to a fifth aspect of the present invention, in the first aspect of the present invention, a front end side of the base frame is joined to the vehicle body floor portion via a flip-up shaft along the seat width direction, and the base frame is turnable about the flip-up shaft to an upright flipped-up position with respect to the vehicle body floor portion.

In the vehicle seat of the fifth aspect of the invention, in the state in which the seatback is tilted forward, the base frame may be turned about the flip-up shaft to the flipped-up position. Thus, the base frame may be stood up relative to the vehicle body floor portion, together with the seatback and the seat cushion. Therefore, the vehicle seat may be compactly stowed. In addition, because the seat cushion moves to the seat lower side and seat rearward side in conjunction with the seatback tilting forward, when the base frame is at the flipped-up position, the seat cushion may be disposed further to the vehicle rearward side and the vehicle upper side. Thus, the seatback overlaid on the seat cushion may be disposed further to the vehicle rearward side, and a large gap may be assured between the seat cushion and the vehicle body floor portion.

BRIEF DESCRIPTION OF THE DRAWINGS

Exemplary Embodiments of the present invention will be described in detail based on the following figures, wherein.

DETAILED DESCRIPTION

Figure 1:
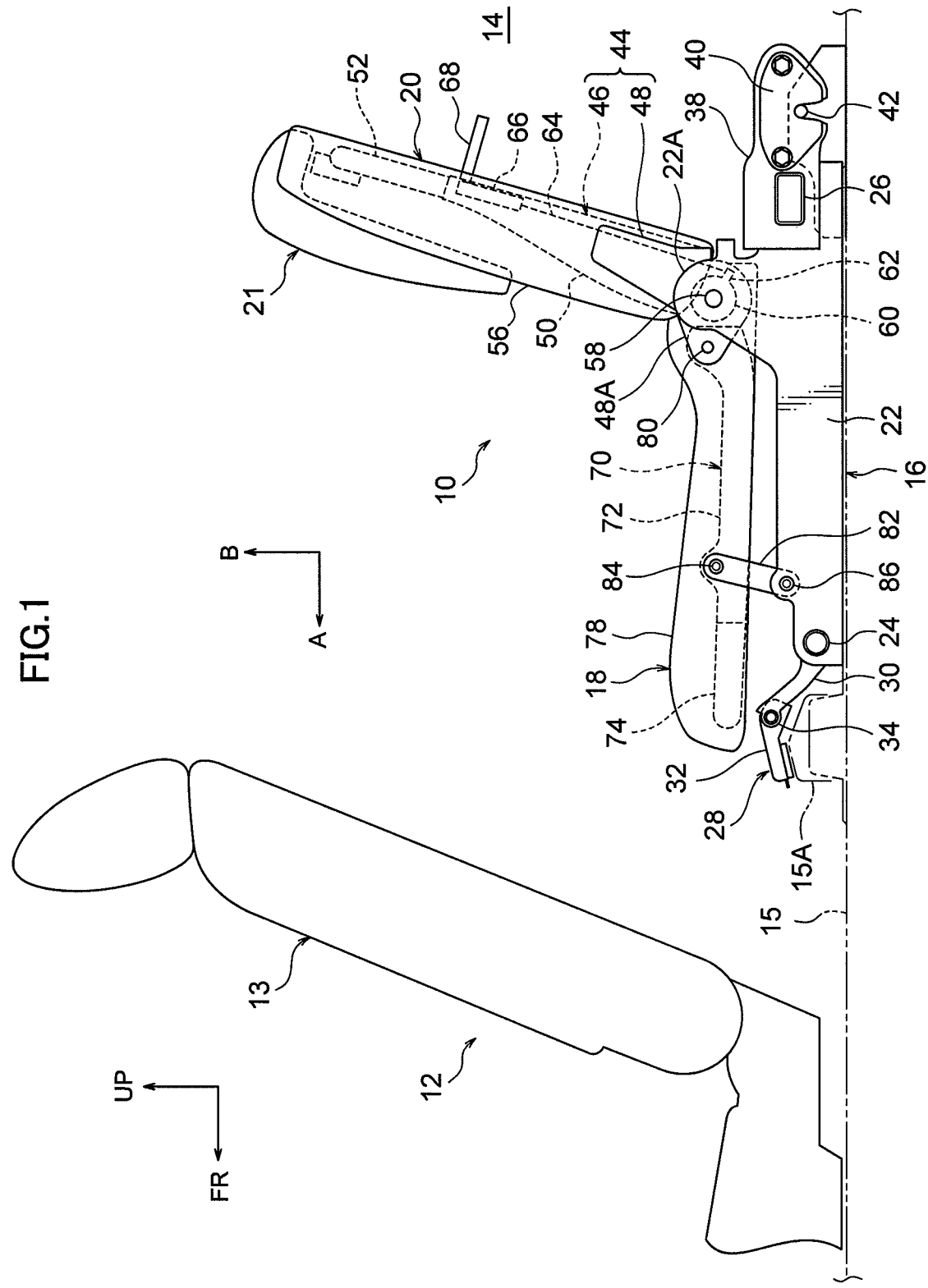
FIG. 1 is a side view of a vehicle seat in accordance with an exemplary embodiment of the present invention, and is a diagram of a state in which a seatback is disposed in an upright position.

Herebelow, a vehicle seat 10 according to an exemplary embodiment of the present invention is described using FIG. 1 to FIG. 5. The arrow FR that is shown where appropriate in the drawings indicates a vehicle forward direction, the arrow UP indicates a vehicle upward direction, and the arrow W indicates a vehicle width direction (a vehicle left-right direction). Further, the arrow A that is shown where appropriate in the drawings represents a forward direction of the vehicle seat 10, and the arrow B represents an upward direction of the vehicle seat 10. A width direction (left-right direction) of the vehicle seat 10 matches the vehicle width direction.

Figure 2:
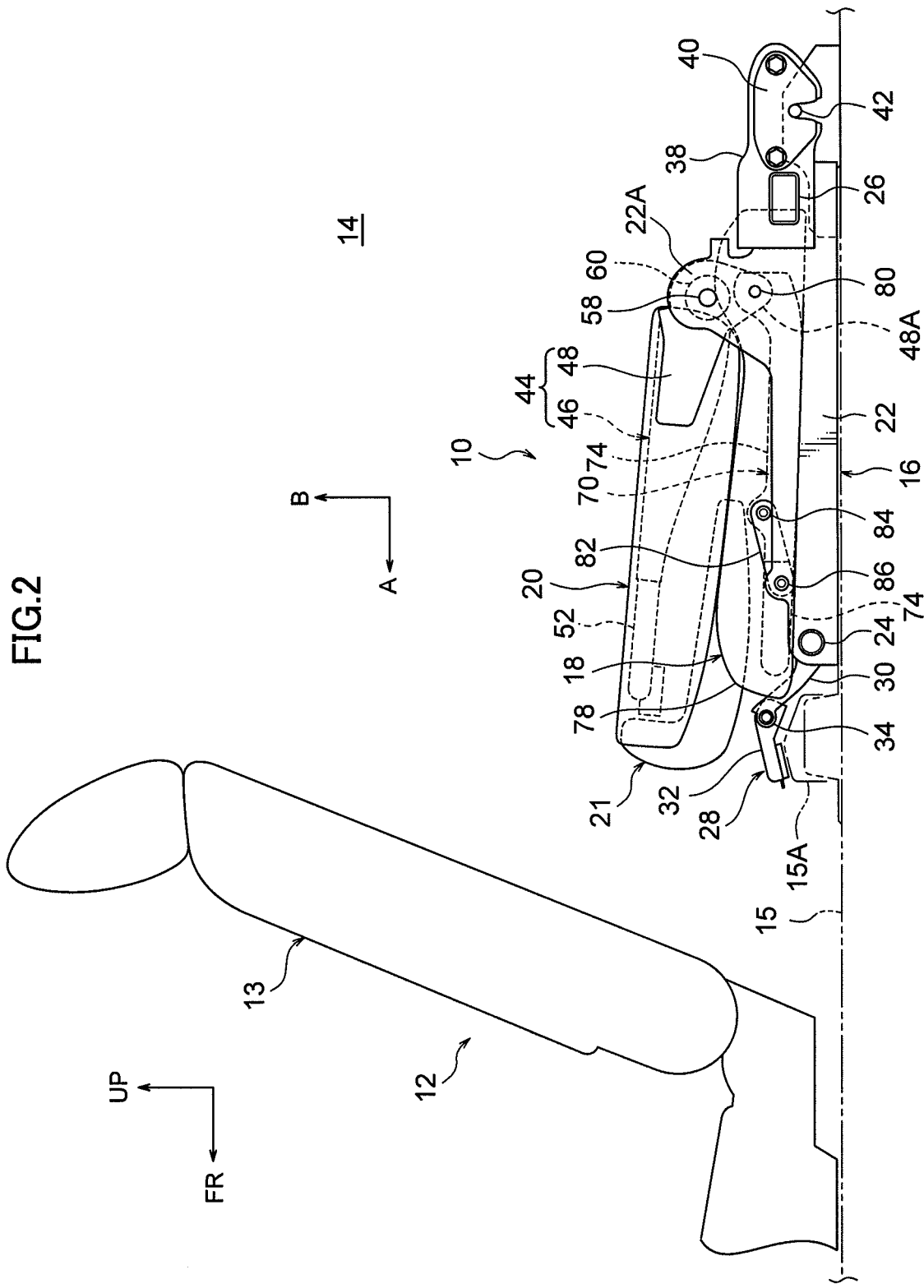
FIG. 2 is a side view of the same seat, and is a diagram of a state in which the seatback is disposed in a forward-tilted position.
Figure 3:
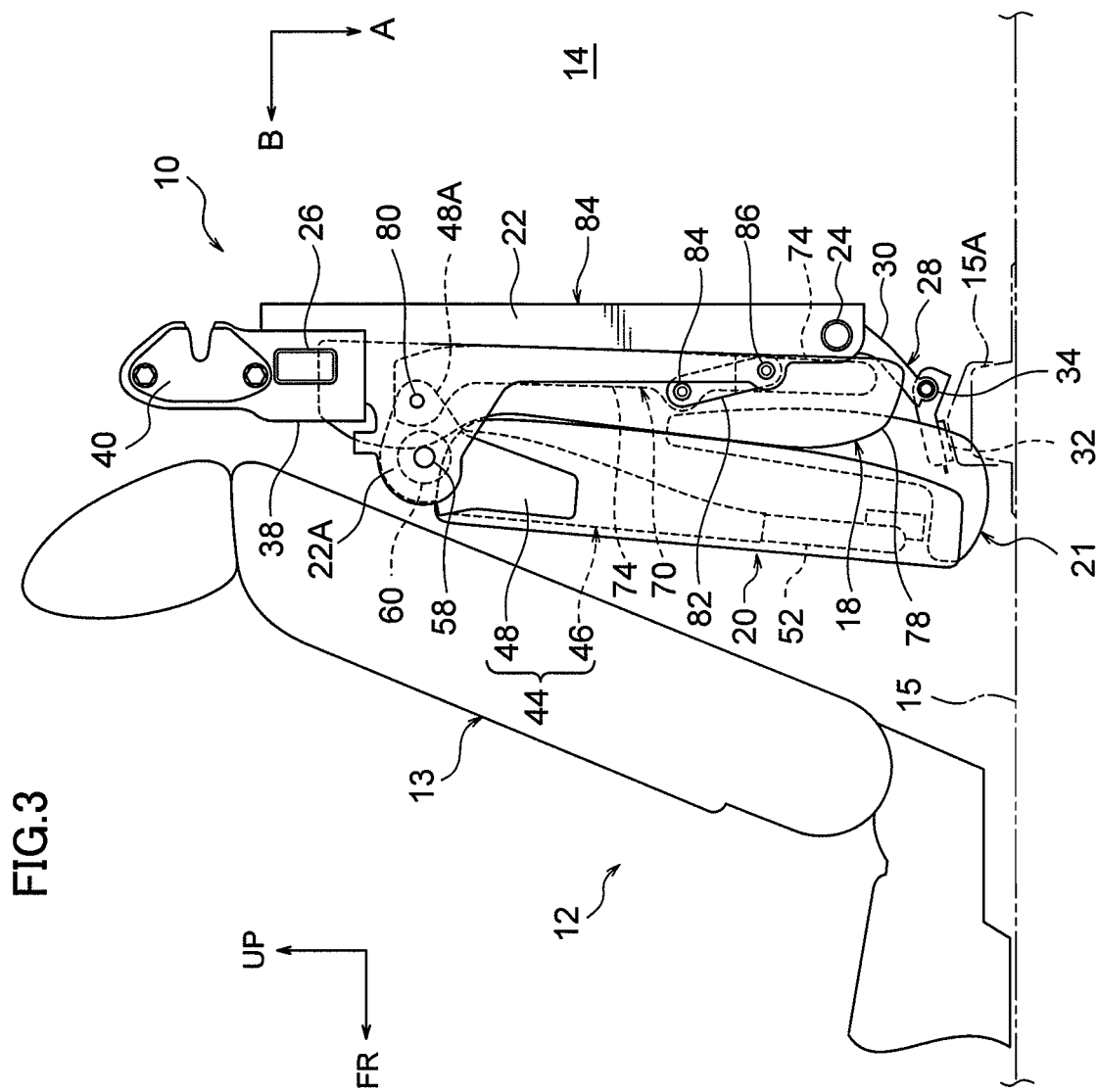
FIG. 3 is a side view of the same seat, and is a diagram of a state in which a base frame is disposed in a flipped-up position.

The vehicle seat 10 according to the present exemplary embodiment is a third seat (a seat in a third row) of a vehicle. As illustrated in FIG. 1 to FIG. 3, the vehicle seat 10 is disposed at the vehicle rearward side of a second seat 12, which is a second row seat, and at the vehicle forward side of a luggage compartment 14. The vehicle seat 10 is equipped with a base frame 16 that is mounted to an upper face side of a floor panel 15 of the vehicle (a vehicle body floor portion). A pair of left and right seat cushions 18 and a pair of left and right seatbacks 20 are supported at the base frame 16. Headrests 21 are mounted to upper portions of the left and right seatbacks 20.

Figure 4:
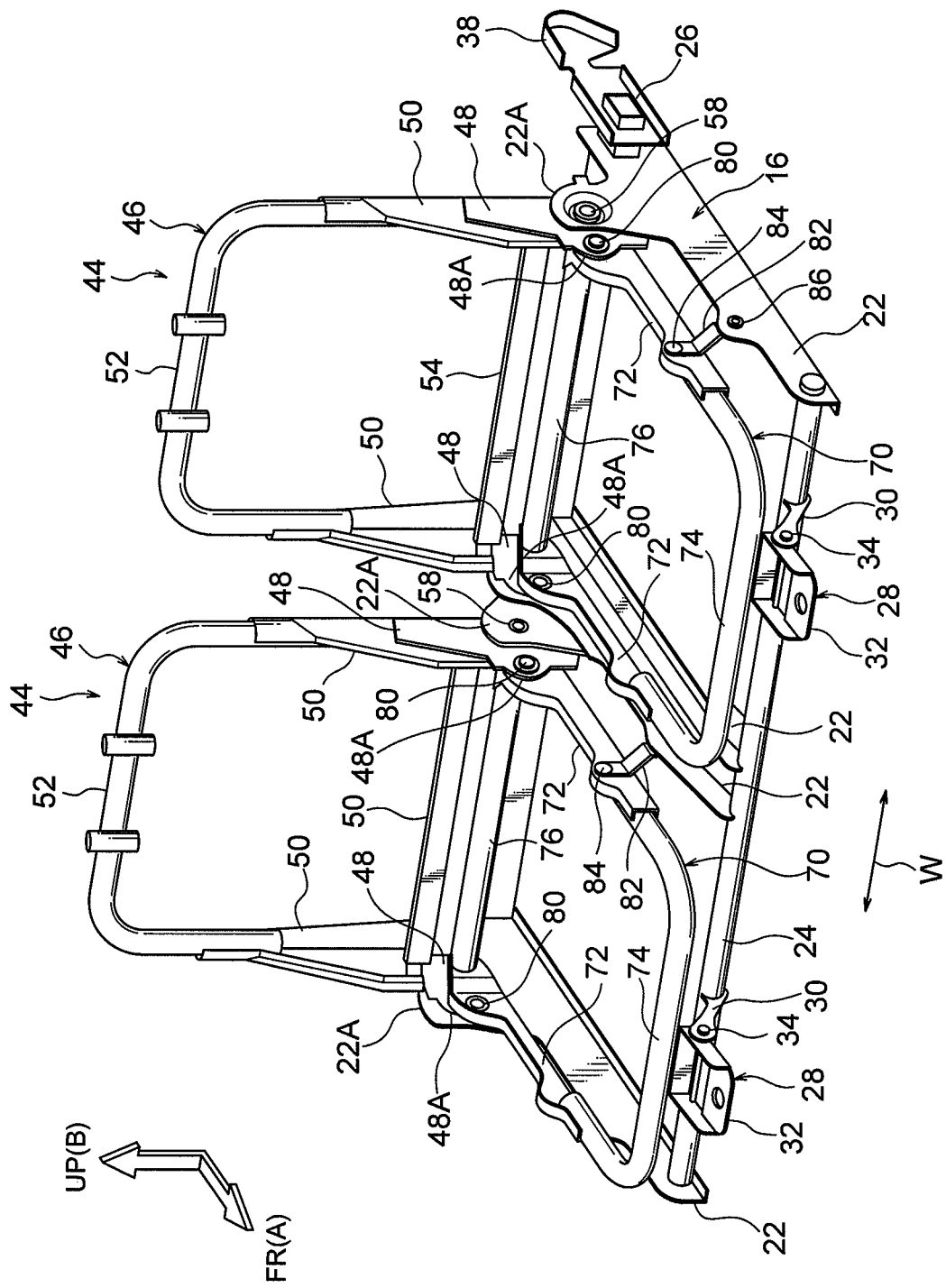
FIG. 4 is a perspective view showing structures of principal portions of the same seat.
Figure 5:
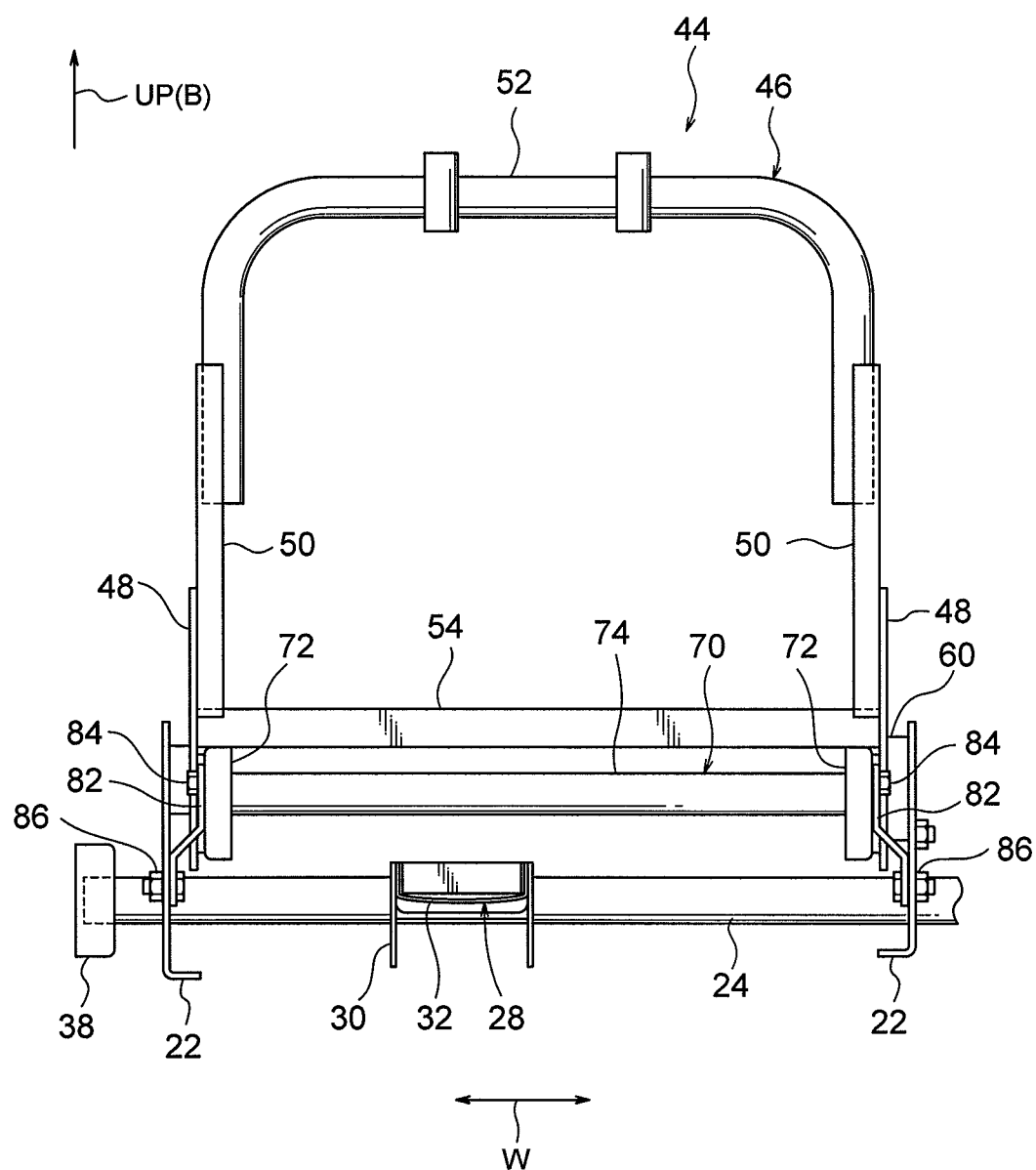
FIG. 5 is a front view showing partial structure of the same seat.

As shown in FIG. 4, the base frame 16 includes four side frames 22 that are provided at each of the two seat width direction sides of each of the left and right seat cushions 18. Each side frame 22 is formed in a long, narrow shape of a metal plate material, and is disposed with the length direction thereof in line with the seat front-rear direction and the plate thickness direction in line with the seat width direction. Front end portions of the side frames 22 are joined in the seat width direction by a front frame 24 in a pipe shape that extends in the seat width direction. Rear end portions of the side frames 22 are joined in the seat width direction by a rear frame 26 in the shape of a square tube that extends in the seat width direction. Seatback joining portions 22A that extend to the upper side are formed at rear end sides of the side frames 22, at the seat forward side relative to the rear frame 26.

Respective hinge portions 28 are provided at the left and right sides of the front frame 24. Each hinge portion 28 includes a protruding portion 30 that protrudes to the seat forward side and the seat upper side from the front frame 24, and a floor fastening portion that is provided at the distal end side of the protruding portion 30. Each floor fastening portion is turnably joined to the distal end portion of the protruding portion 30 via a flip-up shaft 34 along the seat width direction, and is fixed by fastening to a fastening portion 15A provided at the floor panel 15. Thus, the base frame 16 is made turnable about the flip-up shaft 34 with respect to the floor panel 15, between a usual position shown in FIG. 1 and FIG. 2 and a flipped-up position shown in FIG. 3. When the base frame 16 is disposed at the usual position, the forward direction of the vehicle seat 10 matches the vehicle forward direction, and the upward direction of the vehicle seat 10 matches the vehicle upward direction. However, when the base frame 16 is disposed at the flipped-up position, the forward direction of the vehicle seat 10 matches the vehicle downward direction, and the upward direction of the vehicle seat 10 matches the vehicle forward direction.

Both left and right end portions of the rear frame 26 protrude to the seat width direction outer sides relative to the side frames 22 disposed at the seat width direction outer sides. Latch mounting plates 38 formed of a plate metal material are fixed to the protruding regions of the rear frame 26 by means of welding or the like. Each latch mounting plate 38 extends to the seat rearward side relative to the rear frame 26, and a latch mechanism 40 is fixed to the rear portion side of the latch mounting plate 38. The latch mechanism 40 is provided with a latch, which is not shown in the drawings, that catches on a striker 42 fixed at the floor panel 15. Hence, the base frame 16 is restricted to the usual position shown in FIG. 1 and FIG. 2. A strap, which is not shown in the drawings, is joined to the latch mechanism 40. The catching of the latch on the striker 42 may be released by the strap being pulled. Hence, the base frame 16 may be turned to the flipped-up position shown in FIG. 3.

At each seatback 20, a seatback frame 44 is provided, which is a framework member. The seatback frame 44 is structured by a frame main body 46 and a pair of left and right recliner upper brackets (brackets) 48. The frame main body 46 is structured by a pair of left and right side frames 50, an upper frame 52 and a lower frame 54. The side frames 50 are disposed to oppose one another in the seat width direction. The upper frame 52 is joined in the seat width direction to upper end portions of each of the left and right side frames 50. The lower frame 54 is joined in the seat width direction to lower end portions of each of the left and right side frames 50. Thus, the frame main body 46 is formed in a rectangular frame shape as viewed in the front-rear direction of the seatback 20 (see FIG. 5). Seatback springs, which are not shown in the drawings, are mounted to the frame main body 46, and a seatback pad, which is not shown in the drawings, is supported at the frame main body 46. Each seatback pad is covered by a seat cover 56. In the present exemplary embodiment, the left and right side frames 50 are formed of plate metal materials, and the upper frame 52 and lower frame 54 are formed of pipe materials. However, this is not limiting and other frame constitutions may be employed.

Upper portion sides of the left and right recliner upper brackets 48 are fixed by fastening, with nuts and bolts that are not shown in the drawings, to lower end sides of the left and right side frames 50. Lower portion sides of the left and right recliner upper brackets 48 are turnably joined to the aforementioned seatback joining portions 22A of the side frames 22 via a pair of left and right recliner shafts 58 whose axial directions are in line with the seat width direction. Thus, each seatback frame 44 is tiltable (turnable) about the recliner shaft 58 with respect to the base frame 16, between the upright position shown in FIG. 1 and the forward-tilted position shown in FIG. 2. A widely known recliner mechanism 60 (a "round recliner") is provided between one of the seatback joining portions 22A and the one of the recliner upper brackets 48 that is joined to this seatback joining portion 22A. Tilting of the seatback frame 44 from the upright position is restricted (locked) by this recliner mechanism 60. In the state in which the seatback 20 is disposed in the upright position, the seatback 20 is disposed to be tilted to the seat rearward side by a predetermined angle (for example, around 10°) relative to the seat up-down direction.

A lock release lever 62 is provided at this recliner mechanism 60, for releasing the tilting restriction. As shown in FIG. 1, one end portion of a cable 64 is anchored at this lock release lever 62, and the other end side of the cable 64 is wound round a turning member 66 that is disposed at an up-down direction central portion of the seatback 20. The turning member 66 is mounted at the seatback frame 44 to be turnable about an axis along the front-rear direction of the seatback 20, and one end portion of a strap 68 is anchored at the other end portion of the cable 64. The strap 68 is drawn out to the seat rearward side of the seatback 20. The locking of the recliner mechanism 60 may be released by the strap 68 being pulled to the seat rearward side. In FIG. 2 and FIG. 3, the cable 64, the turning member 66 and the strap 68 are not shown in the drawings.

Cushion joining portions 48A are provided at front end sides of lower end sides of the above-mentioned recliner upper brackets 48. Each cushion joining portion 48A protrudes to the forward side of the seatback frame 44. When the recliner upper bracket 48, and thus the seatback frame 44, is tilting forward from the upright position shown in FIG. 1 to the forward-tilted position shown in FIG. 2, the cushion joining portion 48A turns to the seat lower side and the seat rearward side about the recliner shaft 58. The cushion joining portion 48A corresponds with a seat cushion frame 70, which is a framework member of the seat cushion 18.

Each seat cushion frame 70 is structured by a pair of left and right side frames 72, a front frame 74 and a rear frame 76. The side frames 72 oppose one another in the seat width direction. The front frame 74 is joined in the seat width direction to front end portions of each of the left and right side frames 72. The rear frame 76 is joined in the seat width direction to rear end portions of each of the left and right side frames 72. The seat cushion frame 70 forms a rectangular frame shape as viewed in the up-down direction of the seat cushion 18. Seat cushion springs, which are not shown in the drawings, are mounted at the seat cushion frame 70. A seat cushion pad or the like, which is covered by a seat cover 78, is supported at the seat cushion frame 70. In the present exemplary embodiment, the left and right side frames 72 are formed of plate metal materials, and the front frame 74 and rear frame 76 are formed of pipe materials. However, this is not limiting and other frame constitutions may be employed.

The rear end portions of the left and right side frames 72 are joined to the cushion joining portions 48A of the left and right recliner upper brackets 48 via joining shafts 80 whose axial directions are in line with the seat width direction (and which are, for example, stepped bolts and nuts). Thus, the rear end portion of each side frame 72 is turnable about the joining shaft 80 with respect to the recliner upper bracket 48, that is, with respect to the seatback frame 44. In the state in which the seatback frame 44 is disposed in the upright position, the joining shaft 80 is positioned relative to the recliner upper bracket 48 such that the central axis of the joining shaft 80 is disposed at the same height as the central axis of the recliner shaft 58.

A pair of left and right link members 82 are disposed at each side in the seat width direction of the front portion side of each seat cushion frame 70. The link members 82 are formed in long, narrow shapes of plate metal materials. One length direction end portion of each link member 82 is turnably joined to the front end side of the side frame 72 via a link shaft 84 (which is, for example, a stepped bolt and a nut). The other length direction end portion of the link shaft 84 is turnably joined to the front end side of the aforementioned side frame 22 via a link shaft 86 (which is, for example, a stepped bolt and a nut). The link shafts 84 and 86 are disposed with axial directions thereof in line with the seat width direction. Thus, each link member 82 is turnable about an axis along the seat width direction with respect to both the base frame 16 and the respective seat cushion frame 70. In a state in which the seatback frame 44 is disposed in the upright position shown in FIG. 1, which is to say the state in which the cushion joining portions 48A are disposed at the seat forward side of the recliner shaft 58, the link members 82 are disposed upright in a state of being tilted slightly to the seat rearward side relative to the seat up-down direction. Thus, the front portion side of the seat cushion 18 is supported, via the link members 82, at the usage position shown in FIG. 1.

Now, when the seatback 20 is tilted into the forward-tilted position, the rear end portion of the seat cushion frame 70 turns to the seat lower side and seat rearward side about the recliner shaft 58, together with the cushion joining portions 48A. At this time, as shown in FIG. 2, the link members 82 tilt to the seat rearward side. Therefore, the front portion side of the seat cushion frame 70 moves to follow the turning of the cushion joining portions 48A, that is, to the seat lower side and seat rearward side. Thus, the seat cushion 18 stays in a substantially horizontal attitude while moving to the seat lower side and seat rearward side. When the seatback 20 reaches the forward-tilted position shown in FIG. 2, the joining shafts 80 are disposed at the seat lower side of the recliner shaft 58, and the rear end portion of the seat cushion 18 is disposed at the seat lower side of the seatback 20. The link members 82 are tilted slightly up toward the rear relative to the seat front-rear direction, and the seat cushion 18 is disposed at a stowed position that is specified to be at the seat lower side and seat rearward side of the usage position thereof. In this state, the front face of the seatback 20 abuts against the upper face of the seat cushion 18. Therefore, further forward tilting of the seatback 20 is restricted, and the seatback 20 is kept in the forward-tilted position.

On the other hand, when the seatback 20 is tilted from the forward-tilted position to the upright position, the rear end portion of the seat cushion frame 70 turns to the seat upper side and the seat forward side about the recliner shaft 58, together with the cushion joining portions 48A. At this time, the link members 82 rise up to the seat forward side. Thus, the front portion side of the seat cushion frame 70 moves to follow the turning of the cushion joining portions 48A, that is, to the seat upper side and seat forward side. Therefore, the seat cushion 18 stays in the substantially horizontal attitude while moving to the seat upper side and seat forward side. When the seatback 20 reaches the upright position shown in FIG. 1, tilting of the seatback 20 is restricted by the recliner mechanism 60. Thus, the seat cushion 18 is supported (restrained) in the usage position shown in FIG. 1.

Next, operation and effects of the present exemplary embodiment are described.

In the vehicle seat 10 with the structure described above, when each seatback 20 is tilted forward about the recliner shaft 58 with respect to the base frame 16, the cushion joining portions 48A that are disposed at the front end side relative to the recliner shaft 58 at the lower end side of the seatback frame 44 turn to the seat lower side and seat rearward side about the recliner shaft 58. The rear end portion of the seat cushion frame 70 is turnably joined to the cushion joining portions 48A via the joining shafts 80 along the seat width direction. The front portion side of the seat cushion frame 70 is joined to the base frame 16 via the link members 82, and is supported at the base frame 16 to be movable to follow the turning of the cushion joining portions 48A.

Therefore, when the cushion joining portions 48A turn as described above, the rear end side of the seat cushion frame 70 moves to the seat lower side and seat rearward side, and the front portion side of the seat cushion frame 70 moves to follow the turning of the cushion joining portions 48A, that is, to the seat lower side and seat rearward side. Thus, the seat cushion 18 moves to the seat lower side and seat rearward side in conjunction with the forward tilting of the seatback 20, and a height at which the seatback 20 overlaid on the seat cushion 18 by the forward tilting is disposed may be made lower (see FIG. 2). Therefore, space above the seatback may be increased. Moreover, because the seat cushion 18 moves (descends) in conjunction with the forward tilting of the seatback 20 as described above, there is no need for a particular operation for causing the seat cushion 18 to descend, and operability is extremely good.

Because the seat cushion 18 moves to the seat lower side and seat rearward side (vehicle lower side and vehicle rearward side) as described above, a gap between the seat cushion 18 and the second seat 12 (front seat) is increased. As shown in FIG. 2, a seatback 13 of the second seat 12 is usually disposed to lean to the vehicle rearward side. However, in the present exemplary embodiment, because the seat cushion 18 descends as described above, a forward tilting angle of the seatback 20 is increased. Therefore, the gap between the seatback 20 and the seatback 13 of the second seat 12 may be increased. Therefore, arrangement of the seats may be achieved even in vehicle models in which it is difficult to keep a gap between front seats and rear seats large, and the feasibility of seat arrangements in accordance with vehicle models may be improved.

In this vehicle seat 10, when the seatback 20 is disposed in the upright position, the central axis of each joining shaft 80 joining the cushion joining portion 48A of the seatback frame 44 with the rear end portion of the seat cushion frame 70 is disposed at the same height as the central axis of the recliner shaft 58. Therefore, when the seatback 20 tilts forward from the upright position, the joining shaft 80, which is to say the rear end portion of the seat cushion frame 70, may immediately be turned (moved) to the seat lower side and seat rearward side. That is, in a structure in which the central axis of each joining shaft 80 would be disposed at the seat upper side relative to the central axis of the recliner shaft 58 when the seatback 20 was disposed in the upright position, the rear end portion of the seat cushion frame 70 would be turned to the seat lower side and seat forward side for a moment by the forward tilting of the seatback 20 before turning to the seat lower side and seat rearward side. However, this may be avoided in the present exemplary embodiment. Therefore, a large amount of movement of the seat cushion 18 to the seat rearward side may be assured, and a large space at the forward side of the seat cushion 18 in the state in which the seatback 20 is tilted forward may be assured (see FIG. 2).

Furthermore, in the vehicle seat 10, because the front portion side of the seat cushion frame 70 is supported at the base frame 16 via the left and right link members 82, the front portion side of the seat cushion frame 70 is movable to follow the turning of the cushion joining portions 48A when the seatback 20 is tilting forward. Thus, a support structure of the front portion side of the seat cushion frame 70 at the base frame 16 may be a simple structure.

The support structure of the front portion side of the seat cushion frame 70 may be, for example, a structure in which guide means such as guide grooves, guide rails or the like are formed at the front portion side of the base frame 16, and protrusions or the like provided at the front portion side of the seat cushion frame are movably engaged with the guide means. In such a structure, by specification of the form of the guide means, the front portion side of the seat cushion frame 70 may be supported at the base frame 16 to be movable to follow the turning of the cushion joining portions 48A. However, specified portions of the guide means at the base frame 16 protrude significantly to the seat upper side. Therefore, space in the vehicle cabin may be undesirably impinged on by the protruding portions. In regard thereto, because the small link members 82 are employed in the present exemplary embodiment, a height dimension of the front portion side of the base frame 16 may be set low, and the above-stated problem may be eliminated.

In this vehicle seat 10, the recliner upper brackets 48 that are structural members of each seatback frame 44 are fixed to the lower end side of the frame main body 46 of the seatback frame 44, and are joined to the base frame 16 via the recliner shaft 58. The cushion joining portions 48A to which the rear end portion of each seat cushion frame 70 is joined are provided at the recliner upper brackets 48. Thus, the frame main body 46 of the seatback frame 44 and the seat cushion frame 70 are joined to the base frame 16 via the recliner upper brackets 48. Therefore, during fabrication of the vehicle seat 10, the recliner upper brackets 48 may be assembled to the base frame 16 before the frame main body 46 and the seat cushion frame 70, which have large weights, are fixed or fastened to the recliner upper brackets 48. Therefore, operations in fabrication of the vehicle seat 10 may be made simpler.

In the vehicle seat 10, when the seatback 20 has been tilted forward, the base frame 16 may be stood upright with respect to the floor panel 15, together with the seatback 20 and the seat cushion 18 (see the state in FIG. 3), by the base frame 16 being turned about the flip-up shaft 34 to the flipped-up position. Thus, the vehicle seat 10 may be compactly stowed, and space in the luggage compartment 14 may be increased. Furthermore, because the seat cushion 18 is moved to the seat lower side and seat rearward side in conjunction with forward tilting of the seatback 20, the seat cushion 18 may be disposed further to the vehicle rearward side and vehicle upper side when in the flipped-up position. Therefore, the seatback 20 that is overlaid on the seat cushion 18 may be disposed further to the vehicle rearward side, a large gap between the seatback 20 and the second seat 12 may be assured, and a large gap between the seat cushion 18 and the floor panel 15 may be assured.

In this vehicle seat 10, the recliner upper brackets 48, which are structural members of the seatback frame 44, are directly joined to the base frame 16 via the recliner shaft 58, and are restrained at the upright position by the widely known recliner mechanism 60. Therefore, a support stiffness of the seatback frame 44 against a load that acts when there is a collision of the vehicle (for example, a load toward the vehicle rearward side that acts from an occupant when there is a rear end collision of the vehicle) may be kept at the same level as in an ordinary vehicle seat. Therefore, deformation (displacement) of the seatback frame 44 by the above-mentioned load may be reduced. Thus, occupant protection performance when there is a vehicle collision may be excellently assured. Furthermore, because of the simple structure in which the lower end portion of the seatback frame 44 is joined to the base frame 16 via the recliner shaft 58 as mentioned above, the number of components may be reduced, and fabrication costs and the like may be reduced.

—Supplementary Description of the Exemplary Embodiment—

The exemplary embodiment described above has a constitution in which the base frame 16 is turnable about the flip-up shaft 34 of the hinge portions 28 to the flipped-up position. However, the inventions relating to the first to the fourth aspects are not limited thus; structures are possible in which the base frame is non-turnably fixed to the vehicle body floor portion.

In the exemplary embodiment described above, a case is described in which the seatback frame 44 is structured by the frame main body 46 and the left and right recliner upper brackets 48. However, the inventions relating to the first to the third aspects are not limited thus, and the structure of the seatback frame may be suitably modified. For example, structures are possible in which the side frames 50 and the recliner upper brackets 48 are integrally formed.

The exemplary embodiment described above has a structure in which the front portion side of the seat cushion frame 70 is supported at the base frame 16 via the link members 82. However, the inventions relating to the first and the second aspects are not limited thus. The support structure of the front portion side of the seat cushion frame may be a structure of support by guide means and protrusions as mentioned above or the like.

The exemplary embodiment described above has a structure in which the central axis of each joining shaft 80 is disposed at the same height as the central axis of the recliner shaft 58 in the state in which the seatback 20 is disposed in the upright position. However, this is not limiting, and structures are possible in which the central axis of the joining shaft 80 is disposed at the seat lower side relative to the central axis of the recliner shaft 58. Further, with the invention relating to the first aspect, structures are possible in which the central axis of the joining shaft 80 is disposed at the seat upper side relative to the central axis of the recliner shaft 58 when the seatback 20 is disposed in the upright position.

In the exemplary embodiment described above, a case has been described in which the present invention is applied to a third seat of a vehicle but this is not limiting. The present invention may also be applied to a second seat of a vehicle or a front seat or the like. For example, if the present invention is applied to a front seat, when the seatback is tilted forward, a large gap may be assured between the seat cushion and seat back and trim components of the vehicle (such as an instrument panel).

The present invention may be embodied with numerous other modifications within a scope not departing from the spirit of the invention. It will be clear that the scope of the present invention is not to be limited to the above exemplary embodiments.

What is claimed is:

1. A vehicle seat comprising:
a base frame mounted to a vehicle body floor portion;
a seatback, a lower end side of a seatback frame thereof being joined to the base frame via an upper bracket supported on a recliner shaft along a seat width direction, the seatback being capable of tilting forward about the recliner shaft, a cushion joining portion formed as one piece with the upper bracket and being provided at a front end side of the lower end side of the seatback frame relative to the recliner shaft, with the seatback in an upright position of use, and the cushion joining portion turning to a seat lower side and a seat rearward side about the recliner shaft when the seatback is tilted forward; and
a seat cushion, a rear end side of a seat cushion frame thereof being pivotally joined to the cushion joining portion to be turnable about a joining shaft along the seat width direction, and a front portion side of the seat cushion frame being supported at the base frame by at least one link to be movable to follow the turning of the cushion joining portion when the seatback is tilted forward,
wherein the base frame is pivotally connected to the vehicle body at a point forward from a connection of the link to the base frame, and the base frame comprises a latch mechanism that restricts the base frame by engaging with the vehicle body floor portion behind the seatback when the seat cushion and the base frame are generally horizontal in the position of use.

2. The vehicle seat according to claim 1 wherein, in a state in which the seatback is disposed in the upright position of use, a central axis of the joining shaft is disposed at the same height as a central axis of the recliner shaft or at the seat lower side relative to the central axis of the recliner shaft.

3. The vehicle seat according to claim 1, wherein the at least one link is joined to each of the front portion side and the base frame to be turnable about respective axes along the seat width direction.

4. The vehicle seat according to claim 1, wherein the seatback frame comprises: a frame main body; and the upper bracket, wherein the upper bracket is fixed to a lower end side of the frame main body and is joined to the base frame via the recliner shaft.

5. The vehicle seat according to claim 1, wherein a front end side of the base frame is joined to the vehicle body floor portion via a flip-up shaft along the seat width direction, and the base frame is turnable about the flip-up shaft to an upright flipped-up position with respect to the vehicle body floor portion.

* * * * *